Dec. 5, 1939.  R. G. HANDY ET AL  2,182,519
COMBINED GOVERNOR TORQUE TESTING AND SPRING CALIBRATING AND TESTING DEVICE
Filed Oct. 1, 1936  10 Sheets-Sheet 2

INVENTOR
Robert G. Handy
Clayton B. Seymour
Alfons A. Altenberg
BY
Harry H. Hitzeman
ATTORNEY.

Dec. 5, 1939.　　R. G. HANDY ET AL　　2,182,519
COMBINED GOVERNOR TORQUE TESTING AND SPRING CALIBRATING AND TESTING DEVICE
Filed Oct. 1, 1936　　10 Sheets-Sheet 4

INVENTOR.
Robert G. Handy
Clayton B. Seymour
BY Alfons A. Altenberg
Harry H. Hitzeman
ATTORNEY.

Dec. 5, 1939. R. G. HANDY ET AL 2,182,519
COMBINED GOVERNOR TORQUE TESTING AND SPRING CALIBRATING AND TESTING DEVICE
Filed Oct. 1, 1936 10 Sheets-Sheet 6

INVENTOR.
Robert G. Handy
Clayton B. Seymour
BY Alfons A. Altenberg

Harry H. Hitzeman
ATTORNEY.

Dec. 5, 1939.  R. G. HANDY ET AL  2,182,519
COMBINED GOVERNOR TORQUE TESTING AND SPRING CALIBRATING AND TESTING DEVICE
Filed Oct. 1, 1936  10 Sheets-Sheet 7

INVENTOR.
Robert G. Handy
Clayton B. Seymour
BY Alfons A. Attenberg

Harry H. Hitzeman
ATTORNEY.

Dec. 5, 1939.   R. G. HANDY ET AL   2,182,519
COMBINED GOVERNOR TORQUE TESTING AND SPRING CALIBRATING AND TESTING DEVICE
Filed Oct. 1, 1936   10 Sheets—Sheet 10

Fig. 19.

INVENTOR.
Robert G. Handy
Clayton B. Seymour
BY Alfons A. Altenberg

Harry H. Hitzeman
ATTORNEY.

Patented Dec. 5, 1939

2,182,519

UNITED STATES PATENT OFFICE 2,182,519

COMBINED GOVERNOR TORQUE TESTING AND SPRING CALIBRATING AND TESTING DEVICE

Robert G. Handy, Detroit, Mich., and Clayton B. Seymour and Alfons A. Altenberg, Chicago, Ill., assignors to Hoof Products Company, a corporation of Illinois Application October 1, 1936, Serial No. 103,518

13 Claims. (Cl. 265—1)

Our invention relates to improvements in torque testing and spring calibrating and testing devices and the like, and more particularly to an improved device containing the combined mechanism.

Our invention relates more particularly to devices of the type described capable of testing the torque of a automotive engine by the use of an offset valve mounted between the carburetor and intake manifold so that a graph or torque curve can be plotted therefrom and a spring for an automotive engine governor can be built up to meet said torque curve.

In recent years speed control means, commonly called governors, have come into wide and popular use, particularly upon automobile and truck engines and stationary engines of a great many different types, for the purpose of controlling the speed or R. P. M. of the engine under any given load. These governors are of a type which have a valve to definitely limit the amount of gas flow from the carburetor to the intake manifold of the engine in accordance with a designated speed setting. The governor is capable of thus definitely controlling the speed or R. P. M. of the engine throughout the range of operation; that is, from a no-load condition to a maximum power output condition.

The governors of which we speak are of two well known types. One type is provided with compression spring and cam means for controlling the valve and is so arranged that by the combined action of the spring acting upon the cam, a resistance curve is produced which generally follows the torque curve of the engine which is governs. Governors of this type are shown in the patents to Handy et al., No. 1,584,933, Moyers et al., No. 1,733,424, Knaus et al., No. 1,670,365, and others.

The other type of governor and the type to which this invention is particularly adapted, as will be hereinafter explained, is the cantilever spring type of governor having its leaves so arranged that more or fewer spring leaves come into operation as the speed of the engine which it governs is retarded or increased. A governor of this type is shown in the United States patent to Hoof, No. 1,999,758. In manufacturing governors of the above mentioned type, it is necessary to build a governor according to the torque curve of the engine upon which it is to be used. Accordingly, one of the first steps in the construction of a governor in this manner is to determine the torque curve of the particular engine which it is desired to govern. After this has been done, it is necessary to assemble the cantilever spring leaves for controlling the governor valve into a unitary resistance unit in such manner that the resistance offered by the spring unit throughout the range of the torque curve will substantially equal the same.

Accordingly, an object of the present invention is to provide improved means for easily and quickly determining and plotting the torque curve of an automotive engine from a knowledge of the characteristics of the engine.

A further object of the invention is to provide a mechanism of this type that is accurate in operation and one which can be operated to permit the plotting of the torque curve of an automotive engine by a person not possessed of a great degree of engineering skill.

A further object of the invention is to provide a device of this type which may be utilized in conection with a dynamometer to plot the torque curve of any engine after its characteristics, such as size of bore and length of stroke, number of pistons, horse power output and R. P. M. are known.

A further object of the present invention is to provide a device of the type described that is easily and simply constructed and one that will not easily become broken or out of order.

A further object of the present invention is to provide a spring testing and calibrating device having a comparatively simple means associated therewith for testing and calibrating a spring to meet a torque curve.

A further object of the present invention is to provide a combined torque testing and spring calibrating device in such a manner that the same instrument may be alternately used for plotting torque curves and testing and calibrating spring members to meet said curves.

A further object of the present invention is to provide a combined mechanism of the type described that is easily and quickly adapted to be changed from a torque testing to a spring testing and calibrating mechanism.

Other objects and advantages reside in particular features in the construction and assembly of the parts thereof, all of which will be more apparent from the following description wherein reference is had to the accompanying nine sheets of drawings, upon which

By way of general explanation, the purpose and method of making a torque test of a governor valve for a specified engine will first be briefly undertaken. It has been previously stated that the torque test must be made so that the torque curve of the motor upon which the governor is to be mounted can be determined. Accordingly, a torque test is made with a governor on the engine it is intended for, in order to determine its torque characteristics. It may be explained that the governor valves ordinarily operate through a range of approximately 55 degrees from an open to a completely closed position, or to a valve position where maximum power is developed at the particular speed at which it is desired to govern. In order to determine the actual torque or pull on the governor valve throughout its range of travel from its closed position to its wide open position, or from the no-load governing speed to the full load governing speed, it is necessary to measure the torque of the engine so that a spring can be built up to exactly duplicate this torque. The engine speed is held at a constant R. P. M. during this test for reasons which will be apparent hereinafter. It may be explained at this time that while the true torque of an engine is that which is delivered by the crank shaft thereof, there is a direct relation between the crank shaft torque and the suction on the intake manifold. Therefore, for our purpose the torque as measured by the suction in the intake manifold is satisfactory for building a torque curve which a governor must duplicate.

It is usual in making these torque tests to install a governor such as the unit 20 between the carburetor 22 and the intake manifold 24 of a gasoline engine that has been mounted upon a dynamometer. The general purpose and use of a dynamometer is believed to be well known and for this purpose it will be considered sufficient to state that with its speed and load controlling devices the gasoline motor mounted upon the dynamometer can be driven at a desired constant speed even though the load is varied from no-load to maximum horse power output.

Figures 1, 2, 5:
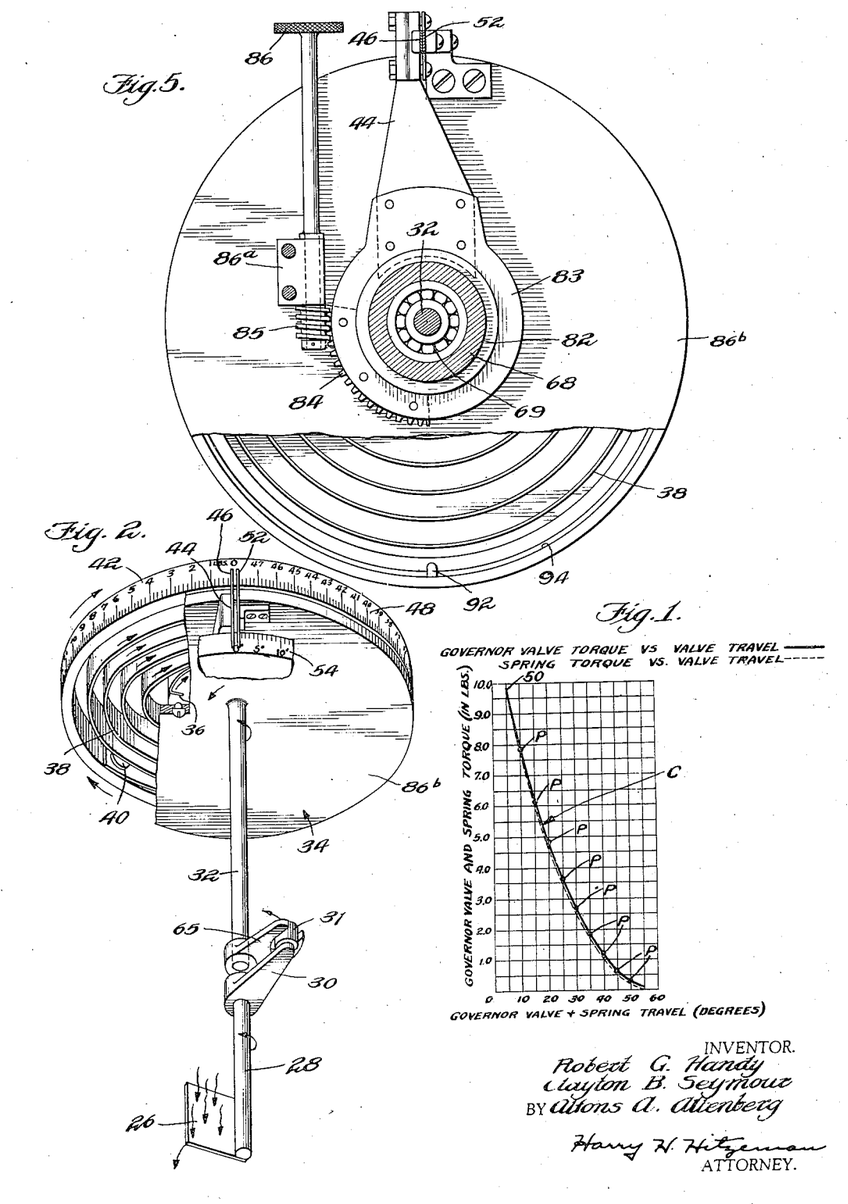
Fig. 1 is a graph illustrating a torque curve and a spring resistance curve that has been plotted from a governor spring built up to meet said torque curve.
Fig. 2 is a diagrammatic view illustrating generally the manner in which the improved torque tester operates.
Fig. 5 is a vertical sectional view taken generally on the line 5—5 of Fig. 3.

As previously stated, the governor 20 which is to be tested for its torque characteristics in connection with a specified size motor whose usual characteristics such as the R. P. M., horse power, etc. are known, is fastened to the torque testing mechanism by suitable connections so that the governor and the testing mechanism can be mounted between the carburetor and the intake manifold of the engine. After thoroughly warming the engine with a wide open throttle, the governor valve is set so that the engine will attain the speed at which governing is required. Referring generally to Fig. 2, the governor valve 26 is thus subject to the vacuum created in the intake manifold by the engine and there is a tendency to draw the valve to a closed position. This force is transmitted through the governor shaft 28 and arm 30 to an axially aligned shaft 32 that is connected to a housing 34, in which the inner end 36 of a calibrated spring 38 is fastened. The outer end of this spring is secured by a pin 40 to the inner wall of a calibrated drum 42. An adjustable stop member 44 has a pointer 46 which overlies the pound scale 48 on the periphery of the drum 42. Thus with the governor valve set in a desired position such as with an opening of 5 degrees as shown at 50 on the graph in Fig. 1, the calibrated drum containing the pound scale markings is turned counterclockwise until the stop member 52 fastened to the housing 34 snaps away from the set position of the torque testing adjustable stop 44. The turning of the drum as indicated will reveal at the pointer 46 the number of pounds of pressure required to move the governor valve at an opening of 5 degrees which means that at the specified speed of the engine as shown on the graph, approximately 10 pounds of pressure are required. The adjustable stop 44 may now be moved a desired number of degrees as shown upon the protractor scale 54. This movement is transmitted to stop member 52 fastened to the housing 34 and the housing 34 and shaft 32 connected thereto are moved accordingly. Due to an interconnection, the valve 26 is opened the same number of degrees. This, due to the increased fuel supplied to the engine, immediately increases the R. P. M. of the same, which, however, is immediately compensated for by increasing the dynamometer load and brings the same down to the speed of the governing test. A similar reading is now taken on the pound scale marking by turning the calibrated drum 42 until the stop 52 leaves the adjustable stop 44. At the desired speed as shown on the graph, a reading is thus taken at 10 degrees opening of the valve and shows a torque of almost 8 pounds. This process is repeated at intervals of 5 degrees or less if desired, until the entire range of valve opening has been covered. Thus, at 5 degree readings, the points P having all been marked upon the graph, a torque curve C will now be obtained by connecting the previously plotted points.

Referring now in more detail to the construction of our improved device, the mechanism may include a bridge casting 60 formed with a pair of forward surfaces 62 upon which the back wall 63 of a governor housing 20 may be mounted, secured in place by suitable cap screws 64. The governor valve shaft 28 may extend through the back wall 63 of the governor and carry the arm 30 which has a rotatable roller 31 secured to its outer end. The bracket 65 is adapted to be secured to the outer end of a shaft 32 aligned with the governor shaft 28. It may carry at its forward end a fork portion 67 adapted to embrace the roller 31 on the end of arm 30. The shaft 32 may extend through a collar 68 and be suitably mounted therein upon the ball bearing journals 69, being held in position by plate members 70 secured to sides of the collar 68. A portion 32a of the shaft may be securely fastened in a collar 70a that is positioned in the drum 42 and to which the inner end 36 of the spring 38 is fastened. A still further reduced portion 32b of shaft 32 may extend into suitable ball bearings 72 mounted in a hub portion 73 formed in the end of drum 42. A washer 74 held in the end of the shaft by a suitable screw member effectively prevents the withdrawal of the shaft from these parts of the assembly.

The protractor frame 75 may be secured to the collar 68 by suitable bolt members 76 which extend through lugs formed thereon and through a plate bracket member 77. Both the bracket and the frame are positioned between peripheral flanges 78 on the collar to prevent sidewise movement. The protractor frame 75 may carry upon its edge a protractor scale 54. Thus in the embodiment illustrated, a protractor scale from 0 to 180 degrees has been provided.

The collar 68 beyond its outer flange 78 is formed with a shoulder portion 82 upon which the frame 83 of the adjustable step member 44 is secured. The adjustable stop member 44 thus rotatably mounted upon the shoulder 82 carries a segmental gear 84. A worm 85 at the end of an adjusting member 86 is adapted to mesh with said segmental gear and upon rotation of the handle 86 the adjustable stop member and the pointer 46 carried thereby may be moved a desired number of degrees as measured upon the scale 54 of the protractor member. The worm 85 and adjusting member 86 are journalled in a bearing 86a that is secured to the underside of the protractor frame 75.

The collar 70a is formed with a reduced shoulder 85a upon which a cover member 86b is mounted and secured in position by a plurality of set screws 87.

The pound scale 48 is on a ring member mounted upon a reduced shoulder 90 on the drum 42 with its lower end resting on the ledge 91 thereof. Means for holding the scale 48 in a desired position on the drum 42 comprise the bolt members 92 that are formed with hook portions 93 to engage in a groove 94 in the inner face of the scale 48. These bolt members may be rigidly held in this position by suitable nut members 95 mounted in openings 96 in the outer face of the housing 71.

Means for turning the calibrated drum 42 are connected therewith and comprise the ring gear 97 secured to a peripheral ledge 98 on the outer side of drum 42, being fastened thereto by suitable screw members 99.

A worm 101 meshes with the ring gear 97 is carried by a shaft 102 in a bracket 103 that is fixedly mounted on the lower side of the protractor frame 75, being secured thereto by a bolt member 105. The outer end of shaft 102 carries a knurled knob 106 so that the worm may be manipulated by hand.

The spring member 38 having been calibrated as previously described, and the pounds pressure of the same being indicated upon the drum 42, it will be apparent that when torque of a definite pressure is acting upon the shaft 32a sufficient to overcome the pressure upon the spring which has previously been placed thereon that at this point the stop member 52 mounted on the cover member 86b will snap away from the said position of the torque testing adjustable stop 44. An adjustable guard 108 in the form of a hook prevents more than a short definite travel for stop member 52. The guard is rigidly secured to the adjustable stop 44. In this manner it will be apparent that a torque curve can be secured from any desired engine specification at any desired speed.

In view of the fact that the torque curve has been prepared for the definite purpose of testing and calibrating a cantilever spring that will meet this curve, it is next necessary to build up a spring according to the torque curve which has been produced.

In Figs. 8 to 11, inclusive, we have illustrated a mechanism for testing and calibrating a spring to meet the torque curve which has been prepared. This mechanism may include a base member 110 which has a goose neck portion 112 secured thereto at one side by screw members 114. The goose neck may extend upwardly and arch inwardly over the central portion of the base and carry a horizontal governor housing support member 116.

Since most of the parts herein are similar to those previously described, we have referred to and numbered them the same as in the torque testing mechanism, adding a suffix where the part is slightly modified. A governor 20 of the type shown in the patent to Hoof, No. 1,999,858, may be mounted upon the support member 116, being secured to a collar 118 by suitable screw members 117. The collar is in turn secured to the support member 116 by the screw members 120. The governor 20 of the type described includes a mounting for a plurality of spring leaves 121 and a governor shaft 122, the shaft 122 having an arm 123 thereon. The arm 123 carries a roller 124 that contacts the end of the first leaf of the spring unit 121. The governor shaft 122 may extend downwardly through the member 116, being supported therein by suitable ball bearing members 126. The governor valve 26 is adapted to be mounted on the shaft. The lower end of the shaft may be supported in a suitable ball bearing journal 128 that is provided in a socket 129 in the upper end of a hollow post member 130. The post member carries at its upper end a calibrated drum support 42b. A calibrated spring pound scale 48 is provided upon a ring member 140 which is mounted in a shallow circular pocket 142 in the upper end of the drum 42b. Screw members 144 are adapted to hold the same in any fixed position with relation to the drum.

The drum 42b is capable of manual manipulation to revolve the same to any desired position. After it has been turned to a desired position, however, it may be securely held in place by means of the split bearing portion 146 which carries a screw-threaded bolt 148 and a hand knob 150 for tightening or loosening the hollow post member 130.

The governor shaft 122, similar to the shaft 32 in the torque testing device previously described is adapted to be connected to a similar housing 34, in which the inner end of the calibrated spring 38 is fastened. The outer end of the spring is secured in a similar manner to the inner wall of the calibrated drum 42b.

The housing 34 may carry a cover member 86b similar to that shown in the torque testing mechanism which may have secured upon its surface adjacent its periphery a pointer member 46 mounted in a suitable bracket 152. The pointer is adapted to overlie the member 54a upon which a protractor scale 54 is provided. This member may be fixedly supported by a bracket 154 secured to the under side of support member 116.

The operation of this mechanism for the purpose of building up a spring unit 121 according to the torque curve shown in Fig. 1 will now be described. With the governor valve 26 in a position coinciding with the position of pointer 46 on the protractor dial 54 at a 55 degree position, a single leaf spring is positioned in its support in the governor housing, contacting the roller 124. By revolving calibrated drum 42b and building up pressure on spring 38 in the manner previously described in connection with plotting the torque curve, resistance to this movement is encountered against the individual leaf of the spring unit 121.

However, when sufficient pressure has been built up in the calibrated spring 38 to overcome the resistance effort of the individual leaf spring, the plate 86b and pointer 46 will start moving with the calibrated drum 48. In this manner it can be seen that at 50 degrees opening of the valve, approximately ⅜ of a pound resistance is met in the leaf spring and as this compares with the reading of the graph which has been made, it is evident that the first leaf spring is satisfactory. If it is not, a stronger or lighter leaf spring is tried, until a satisfactory spring has been found for that particular setting. In a similar manner additional springs are added to build up a resistance to meet any of the other points P on the graph so that when the complete spring is built up it will offer the exact resistance to the effort of the calibrated spring that is shown on the graph in Fig. 1.

In Figs. 12 to 19 inclusive, we have illustrated a combined mechanism for making a torque test and for testing and calibrating a spring to meet the torque curve. This mechanism may include the base member 110, goose neck portion 112 and other parts shown in Figs. 8 and 9.

Figure 12:
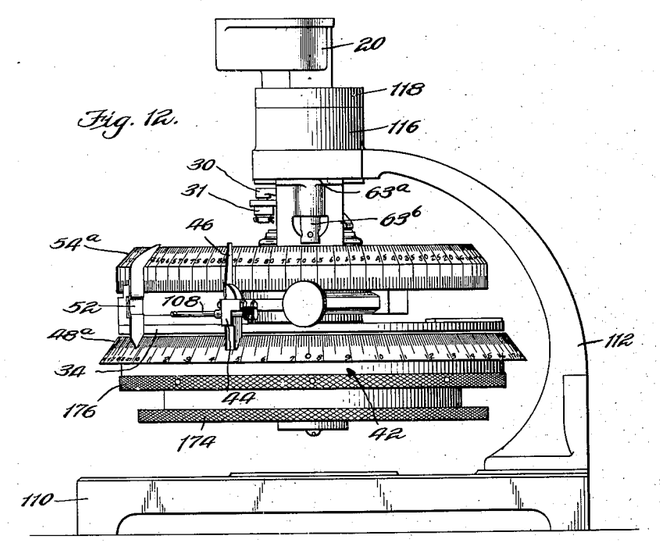
Fig. 12 is a side elevational view of a combined mechanism for making a torque test and for testing and calibrating a spring to meet a torque curve, the mechanism in this view being mounted on a base and set up for testing and calibrating a spring assembly.
Figure 13:
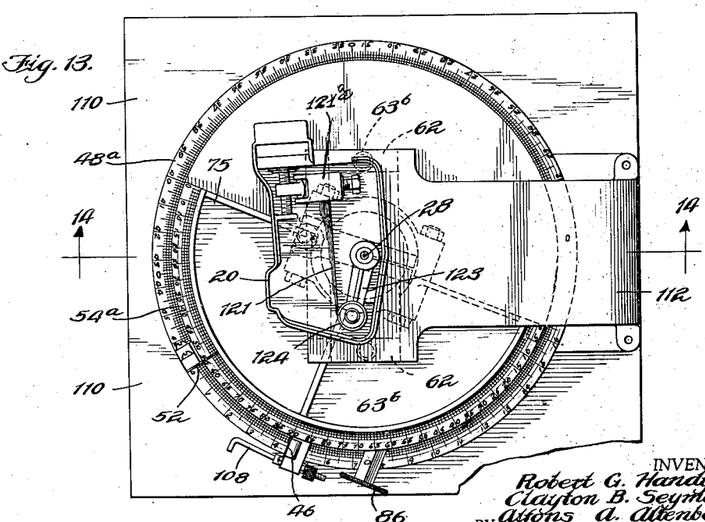
Fig. 13 is a plan view thereof with a governor housing of the type mentioned mounted in position to test the spring resistance unit therein.
Figure 14:
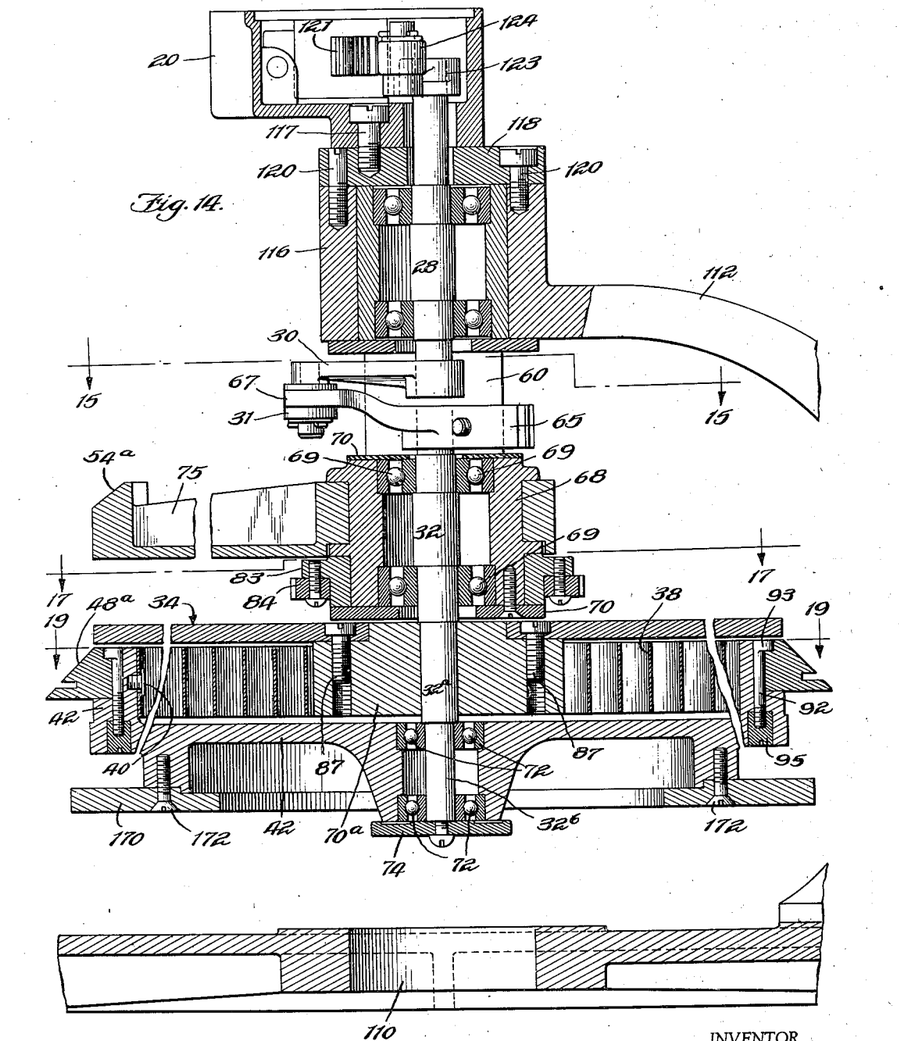
Fig. 14 is a vertical sectional view of the mechanism shown in Fig. 13 taken generally on the line 14—14 of Fig. 13.
Figures 15, 16:
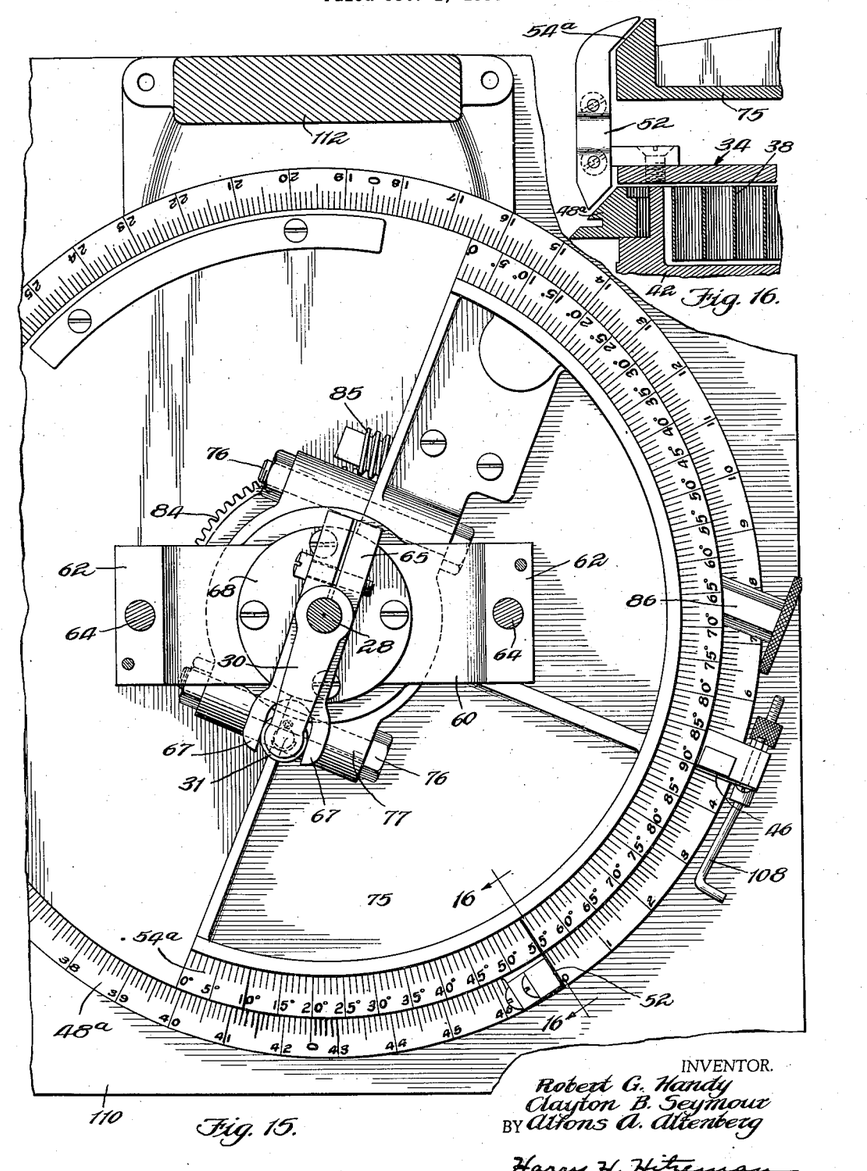
Fig. 15 is a plan sectional view taken generally on the line 15—15 of Fig. 14.
Fig. 16 is a fragmentary sectional view showing one of the indicators or pointers and is taken generally on the line 16—16 of Fig. 15.
Figures 17, 18:
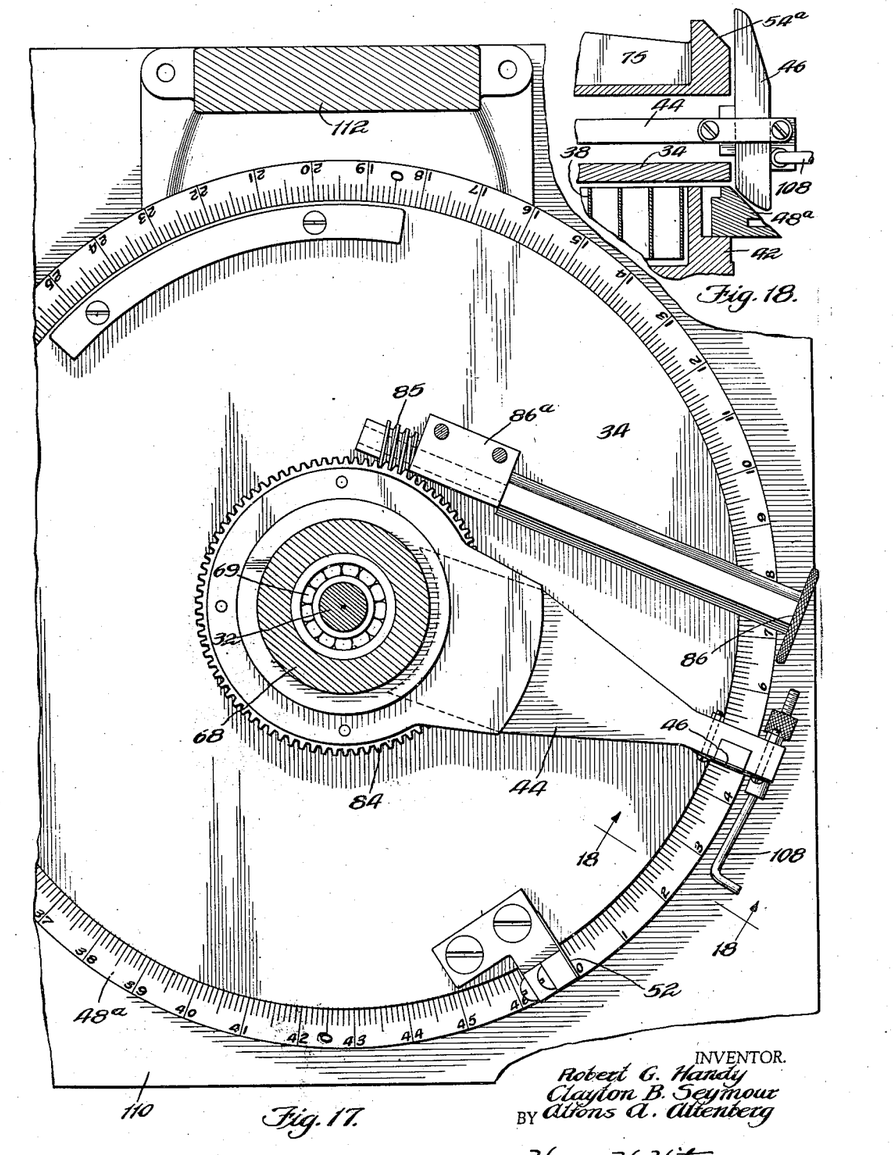
Fig. 17 is a plan sectional view taken generally on the line 17—17 of Fig. 14.
Fig. 18 is a fragmentary vertical sectional view showing one of the pointer members and associated parts taken generally on the line 18—18 of Fig. 17.
Figure 19:
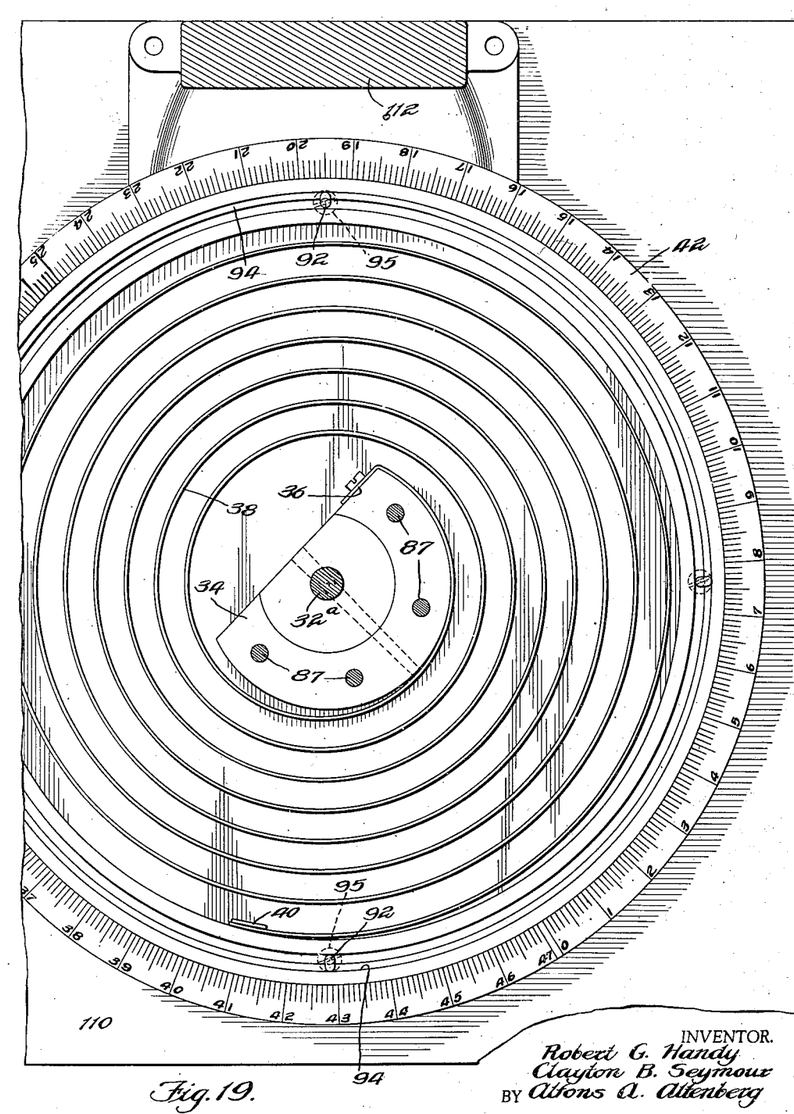
Fig. 19 is a plan sectional view taken generally on the lines 19—19 of Fig. 14.

The governor shaft 28 carries at its lower end the arm 30 and roller 31 in a manner similar to the construction shown in Figs. 2 to 7. The shaft 32 is likewise mounted in suitable bearings 69 and extends through the complete mechanism in the manner similar to that shown in the previously described drawings. However, the collar 68 in this form of the invention is adapted to be supported from the horizontal governor housing support member 116. As shown in Figs. 12 and 13, the member 68 has a pair of upper surfaces 62 which bear against the lower side 63a of the support member 116 and are securely held in position to support the entire mechanism in a horizontal plane by a pair of bolt members 63b. As thus supported in a horizontal position, the mechanism may be identical with that shown in Figs. 2 to 7 with the exception of the drum 42 which in this construction is shown with a pound scale 48a on a 45 degree angle and the protractor scale 54a upon the member 75 at a 45 degree angle. The purpose of this modification is to provide a more convenient positioning of the scales for working with the mechanism in a horizontal position.

In using the device shown in Figs. 12 and 13 as a spring tester, it will be obvious that the governor valve shaft 28 may carry the arm 123 and bear against one or more of the leaf springs in the spring unit 121 as previously described. The spring unit may be mounted in a suitable spring support member 121a (Fig. 12).

In the combined mechanism we have also chosen to omit the means for turning the calibrated drum 42 which comprises generally the ring gear 97 and associated worm 101. In place of this we have shown a ring member 170 secured to the lower part of calibrated drum 42 by suitable screw members 172. The ring member may be formed with a knurled edge 174 for easy manipulation of the drum. A second knurled portion 176 may be provided at a point below the pound scale for convenience in use.

Figures 3, 4:
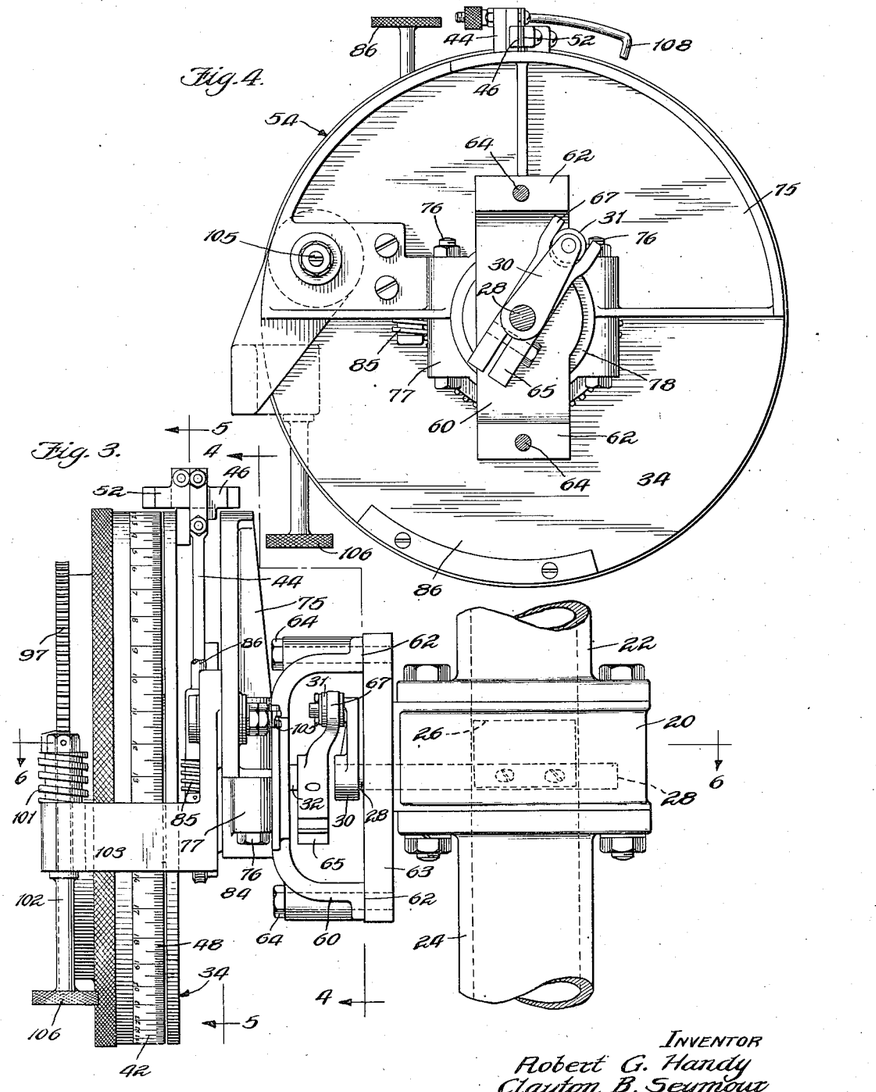
Fig. 3 is a side elevational view of our improved torque tester shown connected with a governor valve mounted between the carburetor and the intake manifold of a gasoline engine and in a position to test the torque of the engine as shown by the suction in the intake manifold.
Fig. 4 is a side view of the device with the governor valve shaft and fastening bolts in section and is taken generally on the line 4—4 of Fig. 3.
Figure 6:
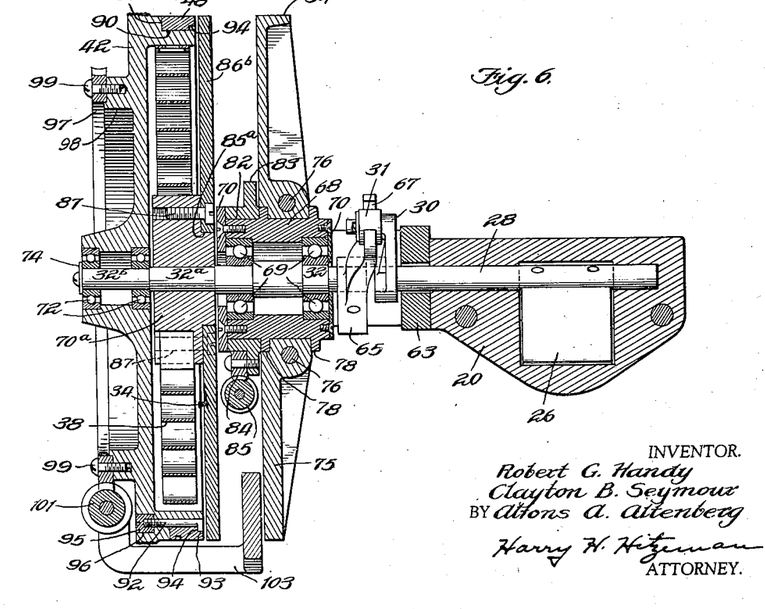
Fig. 6 is a plan sectional view taken generally on the line 6—6 of Fig. 3.
Figure 7:
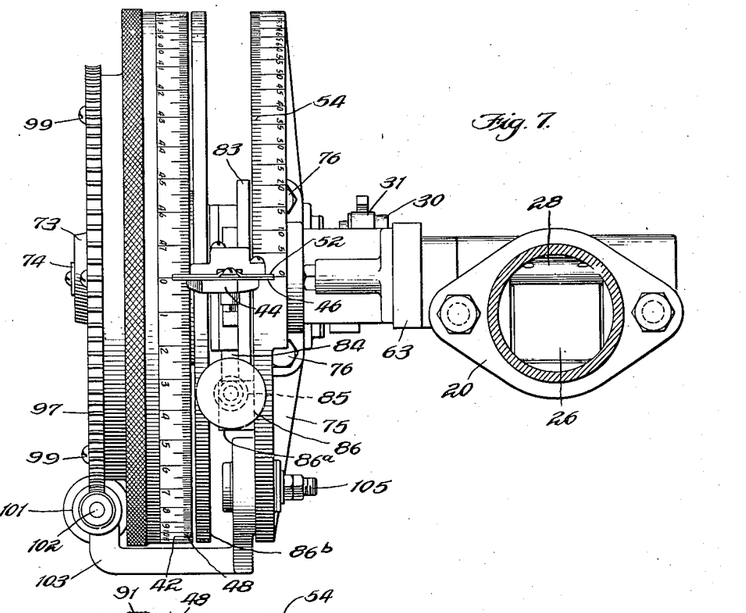
Fig. 7 is a plan view showing the carburetor passageway in section.
Figure 8:
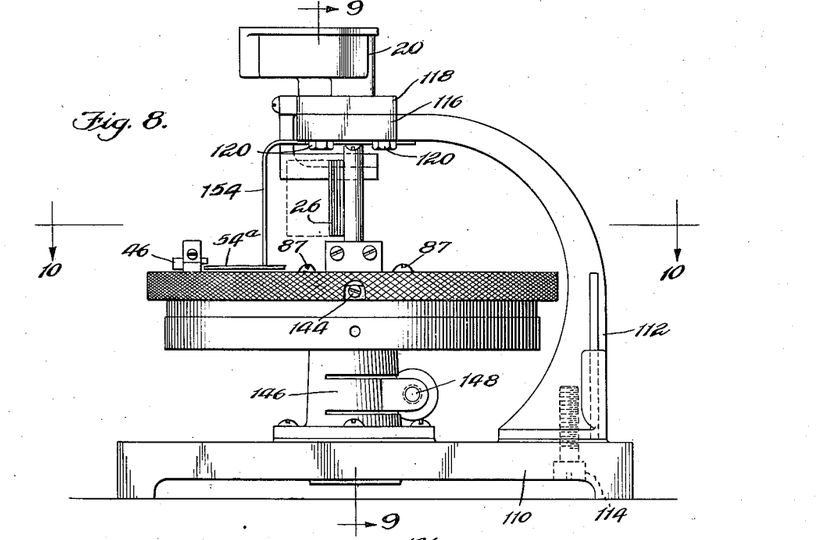
Fig. 8 is a side elevational view of a spring calibrating and testing unit.
Figure 9:
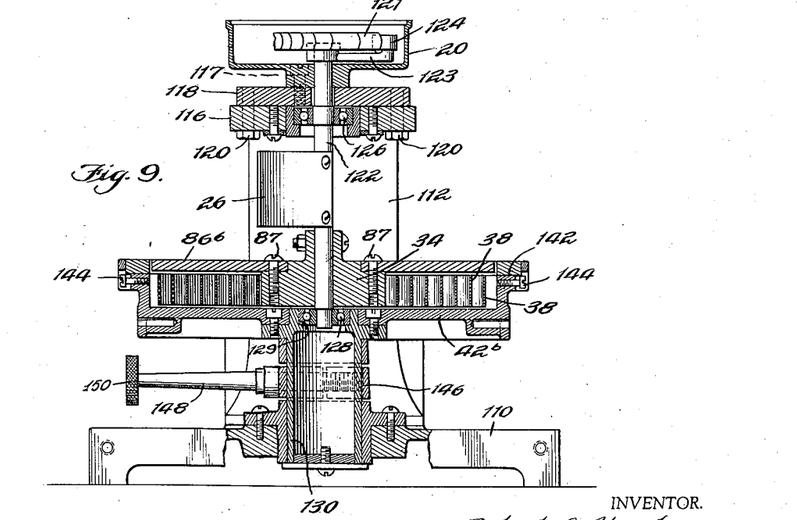
Fig. 9 is a vertical sectional view thereof taken generally on the line 9—9 of Fig. 8.
Figures 10, 11:
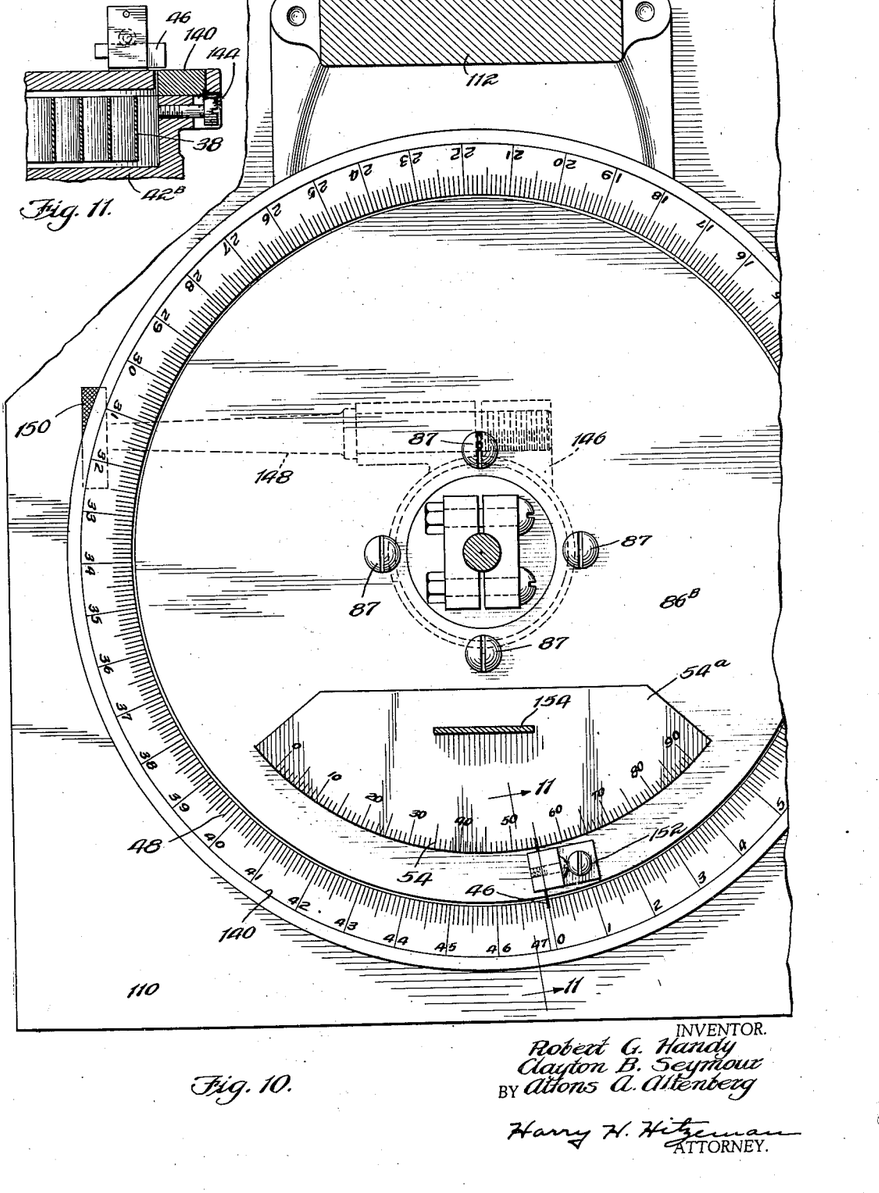
Fig. 10 is a plan sectional view thereof taken generally on the line 10—10 of Fig. 8.
Fig. 11 is a fragmentary sectional view showing the pointer member and associated parts taken generally on line 11—11 of Fig. 10.

From the foregoing description it is believed to be clear that a mechanism has been provided by the use of which an accurate governor torque curve can be plotted for any type of industrial or automotive engine at any desired R. P. M. It will thus be apparent that with the mechanism as shown in Fig. 3 the device is used to test the torque of an engine and with the addition of the base, goose-neck 112 and the other parts as shown in Figs. 12 and 13, the mechanism is operable as a spring tester.

It will further be obvious that by the use of the same mechanism by which the torque curve has been plotted a resistance spring can be built up without any danger of error between the readings of the resistance curve and the torque curve, due to the fact that the same instrument has been used to plot both curves.

While we have illustrated and described one embodimet of our invention and the manner in which the same calibrated spring and scales may be employed in individual units as governor torque curve testing instruments and as spring resistance testing and plotting instruments, it will be apparent to those skilled in the art that changes and modifications may be made in the exact details shown, and we do not wish to be limited in any particular, rather what we desire to secure and protect by Letters Patent of the United States is:

1. Means for testing and determining the torque of an automotive engine as indicated by the suction in the intake manifold by the use of a valve associated with the intake manifold of said engine, said means including a calibrated spring adapted to be directly acted upon by movement of said valve, a protractor member, means connected with said valve for indicating upon said protractor the degrees movement of said valve and means associated with said calibrated spring for indicating the pounds pressure at said valve caused by the suction at different degrees of opening settings thereof.

2. Means for testing and determining the torque of an automotive engine as indicated by the suction in the intake manifold by the use of a valve associated with the intake manifold of said engine, said means including a calibrated spring adapted to be directly acted upon by movement of said valve, a protractor member, means connected with said valve for indicating upon said protractor the degrees movement of said valve and means associated with said calibrated spring for indicating the pounds pressure at said valve caused by the suction at different degrees of opening settings thereof, said last named means including a movable dial associated with said spring.

3. Means for testing and determining the torque of an automotive engine as indicated by the suction in the intake manifold by the use of a valve associated with the intake manifold of said engine, said means including a calibrated spring adapted to be directly acted upon by movement of said valve, a protractor member, means connected with said valve for indicating upon said protractor the degrees movement of said valve and means associated with said calibrated spring for indicating the pounds pressure at said valve caused by the suction at different degrees of opening settings thereof, said last named means including a movable dial and pointer associated with said spring.

4. Apparatus for determining the torque curve of an automotive engine as indicated by the suction in the intake manifold by the use of a valve associated with the intake manifold thereof, said means including a shaft connected with said valve, a coiled calibrated spring having two ends, said spring having its inner end connected to said shaft, a housing enclosing said spring, calibrated drum on the exterior of said housing, said spring having its outer end connected to said housing, a protractor member associated with said shaft and adapted to indicate the degrees of movement of the same, whereby said calibrated drum and spring may indicate in connection therewith the torque pound pressure at any specified position of said valve caused by the suction in the intake manifold.

5. Apparatus for determining the torque curve of an automotive engine as indicated by the suction in the intake manifold by the use of a valve associated with the intake manifold thereof, said means including a shaft connected with said valve, a coiled calibrated spring having an inner and an outer end, said spring having its inner end connected to said shaft, a housing enclosing said spring, a calibrated drum on the exterior of said housing, said spring having its outer end connected to said housing, a protractor member associated with said shaft and adapted to indicate the degrees of movement of the same, and pointer means associated with both said protractor member and said calibrated drum, whereby said calibrated drum and spring may indicate in connection therewith the torque pound pressure at any specified position of said valve as caused by the suction in the intake manifold.

6. Apparatus of the class described comprising a valve, a shaft extending therefrom, a second shaft interconnected with said shaft, a member secured to the end of said second shaft, a coiled calibrated spring having an inner and outer end, the inner end of said spring secured to said member, a housing for said spring, the outer end of said spring secured to said housing, a calibrated pound pressure dial secured to said housing, a protractor associated with said calibrated spring, an adjustable pointer associated with said protractor and a movable pointer connected to said member to which said spring is attached, and adapted upon the movement of said valve to register the pounds pressure of the force moving said valve upon said calibrated dial.

7. Apparatus of the class described comprising a valve, a shaft extending therefrom, a second shaft interconnected with said shaft, a member secured to the end of said second shaft, a coiled calibrated spring having an inner and an outer end, the inner end of said spring secured to said member, a housing for said spring, the outer end of said spring secured to said housing, a calibrated pound pressure dial secured to said housing, a protractor associated with said calibrated spring, an adjustable pointer associated with said protractor, a pointer connected to said member to which said spring is attached and adapted upon the movement of said valve to register the pounds pressure of the force moving said valve upon said calibrated dial and means including a worm and worm wheel for moving said adjustable pointer.

8. Apparatus of the class described comprising a supporting frame adapted to have a governor spring to be tested mounted at the upper end thereof in testing position, a shaft extending vertically through said frame, an arm extending from said shaft engaging said spring, a second shaft interconnected with said shaft, a member secured to the end of said second shaft, a coiled calibrated spring having an inner and an outer end, the inner end of said spring secured to said member, a circular housing for said spring having an upright circular ledge therein, the outer end of said spring secured to said housing within said ledge, a calibrated pound pressure dial secured to said housing about the outside of said circular ledge, a protractor, an adjustable pointer associated with said protractor overlying said circular ledge and a movable pointer connected to said member to which said spring is attached overlying the dial and adapted upon the movement of said aligned shafts to register the pounds pressure of the force moving against said spring at different positions of said governor spring.

9. Apparatus of the class described comprising a supporting frame adapted to have a governor spring to be tested mounted at the upper end thereof in testing position, a shaft extending vertically through said frame, an arm extending from said shaft engaging said spring, a second shaft interconnected with said shaft, a member secured to the end of said second shaft, a coiled calibrated spring having an inner and an outer end, the inner end of said spring secured to said member, a circular housing for said spring having an upright circular ledge therein, the outer end of said spring secured to said housing within said ledge, a calibrated pound pressure dial secured to said housing about the outside of said circular ledge, a protractor, an adjustable pointer associated with said protractor overlying said circular ledge, a movable pointer connected to said member to which said spring is attached overlying the dial and adapted upon the movement of said aligned shafts to register the pounds pressure of the force moving against said first mentioned spring at different positions of said spring, and worm and worm wheel means for micrometer adjustment of said adjustable pointer.

10. Apparatus of the class described comprising a supporting frame adapted to have a governor spring to be tested mounted at the upper end thereof in testing position, a shaft engaging said spring and extending vertically through said frame, a second shaft interconnected with said shaft, a coiled calibrated spring having an inner and an outer end, the inner end of said spring secured to said second shaft, a circular housing for said spring having an upright circular ledge therein, the outer end of said spring secured to said housing within said ledge, a calibrated pound pressure dial secured to said housing about the outsaid of said circular ledge, a protractor, an adjustable pointer associated with said protractor overlying said circular ledge and a movable pointer connected to said member to which said spring is attached overlying the dial and adapted upon the movement of said aligned shafts to register the pounds pressure of the force moving against said first mentioned spring at different positions of said spring.

11. Apparatus for determining the torque curve of an automotive engine as shown by the suction in the intake manifold by the use of a valve associated with the intake manifold thereof and for determining and calibrating the strength of a resistance spring unit including a coiled calibrated spring having an inner and an outer end, a shaft connected to its inner end, a calibrated drum connected to its outer end, a protractor member associated with said shaft and adapted to indicate the degrees of movement of the same, and pointer means associated with both said protractor member and said calibrated drum.

12. Apparatus for determining the torque curve of an automotive engine as shown by the suction in the intake manifold by the use of a valve associated with the intake manifold thereof and for determining and calibrating the strength of a resistance spring unit including a coiled calibrated spring having an inner and an outer end, a shaft connected to its inner end, a calibrated drum connected to its outer end, a protractor member associated with said shaft and adapted to indicate the degrees of movement of the same and a movable and a fixed pointer means associated with said protractor member and said calibrated drum.

13. Mechanism for determining the torque curve of an automotive engine as shown by the suction in the intake manifold by the use of a valve associated with the intake manifold thereof and for determining and calibrating the strength of a resistance spring, said mechanism including a coiled spring member of know characteristics having an inner and an outer end, a shaft connected to its inner end, a calibrated drum connected to its outer end, a protractor member associated with said shaft and adapted to indicate the degree of movement of the same, and means associated with both said protractor member and said calibrated drum for indicating upon said drum the pounds of pressure upon said spring at any determined degree of movement.

ROBERT G. HANDY.
CLAYTON B. SEYMOUR.
ALFONS A. ALTENBERG.